United States Patent Office 2,873,269
Patented Feb. 10, 1959

2,873,269
MONOAZO-DYESTUFFS

Alfred Fasciati, Bottmingen, Raymond Gunst, Binningen, Henri Riat, Arlesheim, and Karl Seitz, Neu-Allschwil, Switzerland, assignors to Ciba Limited, Basel, Switzerland, a Swiss firm No Drawing. Application September 9, 1957
Serial No. 682,584

Claims priority, application Switzerland
September 14, 1956

12 Claims. (Cl. 260—153)

The present invention provides new, valuable monoazo dyestuffs containing at least two water-solubilizing groups and a 4-amino-2-halogen-1:3:5-triazine radical attached to the dyestuff molecule by way of an amino bridge, preferably by way of an amino group of the formula

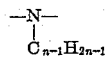

(in which $n$ indicates a positive whole number) in β-position of a β-aminonaphthalene sulfonic acid attached to the azo group in adjacent position to a hydroxyl group, and of which the amino group in 4-position contains at most 12 carbon atoms.

As such dyestuffs may primarily be mentioned those of the formula (1)
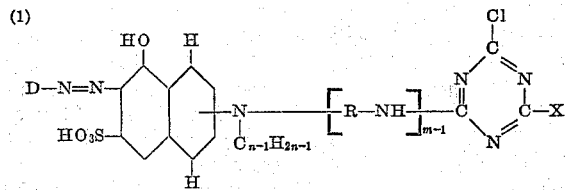

in which X indicates an $NH_2$-group or the radical of an organic, preferably primary, monoamine, containing at most 12 carbon atoms and, if it is aromatic, also containing preferably a sulfonic acid or carboxyl group, $n$ is a positive whole number which is at most 3, D is the radical of a diazo component, R an aromatic radical, preferably a benzene radical, which is attached to the

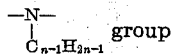 group directly or by way of a —CO— or —$SO_2$ group, and $m$ is a positive whole number which is either 1 or 2, and in which an acid water-solubilizing group is present in at least one of the radicals D, R and X.

The radical D can be an unsubstituted phenyl radical or a methyl, alkoxy, chloro or nitrophenyl radical or a still larger radical, for example a bicyclic radical, such as a naphthalene or diphenyl radical.

Together with a triazine substituent of the specified type, the dyestuffs of the invention also contain at least preferably two, strongly acid, water solubilizing groups such as carboxyl or more especially sulfonic acid groups. These water-solubilizing groups can be distributed in any manner in the dyestuff molecule.

The dyestuffs of this invention can be produced from the corresponding dyestuffs containing a dihalogen-, especially a 2:4-dichloro-1:3:5-triazine radical by replacing one of the two chlorine atoms in such dichlorotriazine dyestuffs by an amino group by condensation with ammonia or with an amine, preferably a primary amine, containing at most 12 carbon atoms. The dihalogen triazine dyestuffs to be used in this case can be obtained by methods of known type by reaction of amino monoazo dyestuffs containing an acylatable amino group in β-position of a β-aminonaphthalene sulfonic acid attached to the azo group preferably in adjacent position to a hydroxyl group, with cyanuric halides, especially with cyanuric chloride (2:4:6-trichloro-1:3:5-triazine) in the molecular proportion of at least 1:1 or from the corresponding dyestuff components containing dichlorotriazine radicals.

If the dihalogen triazine dyestuffs to be used in this case as starting dyestuffs already contain two or more than two water-solubilizing groups, ammonia or an amine free from acid, water-solubilizing groups can be used in the reaction, whereas the halogen atom to be replaced must be exchanged for the radical of an amine containing water-solubilizing groups, if a single water-solubilizing group is present in the dihalogen triazine dyestuff.

For the production of the acylatable starting dyestuffs to be condensed with cyanuric chloride there are concerned as coupling components β-aminonaphthalene sulfonic acids that are able to couple on account of the presence of an aromatically bound hydroxyl group. As such coupling components may be mentioned for example:

2-amino-6-hydroxynaphthalene-8-sulfonic acid,
2-amino-8-hydroxynaphthalene-6-sulfonic acid,
2-N-methylamino-8-hydroxynaphthalene-6-sulfonic acid,
2-alkyl- or -arylamino-5-hydroxynaphthalene-7-sulfonic acid,
2-amino-5-hydroxynaphthalene-7-sulfonic acid,
2-amino-5-hydroxynaphthalene-1:7-disulfonic acid,
2 - (4' - aminobenzolamino) - 5 - hydroxynapthhalene - 7-sulfonic acid,
2 - (4' - aminophenylamino) - 5 - hydroxynaphthalene - 7-sulfonic acid, 2 - (4' - aminophenylamino)-5-hydroxynaphthalene-3':7-disulfonic acid.

The diazo components to be coupled with these coupling components can contain non-water-solubilizing substituents and can be either relatively simple compounds, for example aniline derivatives, aminobenzene sulfonic acids, aminonaphthalene sulfonic acids, aminopyrene- or -chrysene sulfonic acids, aminonaphthol sulfonic acids or aminophenol sulfonic acids, or complicated diazotisable compounds.

As examples of amines the diazo compounds of which are applicable for coupling with the specified coupling components containing acylatable amino groups, the following amino sulfonic acids may be mentioned by way of example:

1-aminobenzene-2-, -3-, or -4-sulfonic acid,
1-aminobenzene-2-, -3-, or -4-carboxylic acid,
2-amino-1-methoxybenzene-4-sulfonic acid,
3-amino-2-hydroxybenzoic acid-5-sulfonic acid,
3-amino-6-hydroxybenzoic acid-5-sulfonic acid,
2-aminophenol-4-sulfonic acid,
5-acetylamino-2-aminobenzene-1-sulfonic acid,
4-acetylamino-2-aminobenzene-1-sulfonic acid,
5-acetylamino- or 5-benzoylamino-2-aminobenzene-1-carboxylic acid,
2-aminobenzoic acid-4- or -5-sulfonic acid,
1-aminonaphthalene-4-, -5-, -6- or -7-sulfonic acid, 2-aminonaphthalene-4-, -6-, -7- or -8-sulfonic acid,
1-aminonaphthalene-3:6-disulfonic acid,
1-aminobenzene-2:5-disulfonic acid,
2-aminonaphthalene-4:8-, 5:7- or -6:8-disulfonic acid,
1-(3'- or 4'-aminobenzoyl)-aminobenzene-3-sulfonic acid,
3-aminopyrene-8- or -10-monosulfonic acid,
3-aminopyrene-5:8- or -5:10-disulfonic acid,
4-nitro-4'-aminostilbene-2:2'-disulfonic acid, also O-acyl derivatives of aminonaphthol sulfonic acids, e. g. the O-acyl derivatives of 1-amino-8-hydroxynaphthalene-3:6- or -4:6-disulfonic acids, dehydrothiotoluidine-mono- or -disulfonic acids and so on.

The condensation of the amino monoazo dyestuffs obtained from these components with cyanuric chloride is to be carried out in such a manner that there still remain in the resulting condensation product two replaceable halogen atoms of which one is replaced by the present process for the radical of an amino compound of the specified type. As such amino compounds are here concerned together with ammonia, amines such as methyl, dimethyl, ethyl, diethyl, propyl, isopropyl, butyl, hexyl or cyclohexyl-amine, piperidine, morpholine, β-chlorethylamine, methoxyethylamine, γ-methoxy-propylamine, ethanolamines, propanolamines and acylated amines such as acetamide, butyric acid amide, urea, thiourea, hydrazine, thiosemicarbazide and toluene sulfonic acid amides, also glycocol, amino-carbonic acid esters such as the methyl or ethyl ester, amino acetic acid ethyl ester, aminoacetamide and especially 1-aminobenzene-2:5-disulfonic acid, 1-aminobenzene-2-, -3- or -4-sulfonic acid, 1-aminobenzene-2-, -3-, or -4-carboxylic acid, β-aminoethane sulfonic acid and N-methylamino ethane sulfonic acid.

The condensation according to the invention of these amino compounds with dihalogen triazine dyestuffs is advantageously carried out with the use of acid-binding agents such as sodium acetate, sodium carbonate or sodium hydroxide, and under such conditions that in the product produced one replaceable halogen atom remains, i. e., for example, in organic solvents or at relatively low temperatures in aqueous agents.

The monoazo dyestuffs of this invention can likewise be prepared by means of a modification of the process described immediately above. This modification of the process consists in that the amino monoazo dyestuffs applicable as starting materials for the manufacture of the dichlorotriazine dyestuffs, for example the amino monoazo dyestuffs obtainable from the components set forth above, are condensed with dihalogen triazines of the formula (2)
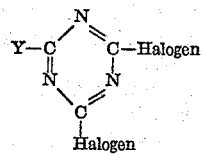

in which Y is an amino group containing at most 12 carbon atoms, which must contain a water-solubilizing group if only one sulfonic acid group is present in the initial monoazo dyestuff.

The dihalogen triazines of this constitution can be prepared by methods of known type from cyanuric halides such as cyanuric bromide or cyanuric chloride, for example by reacting 1 mol of cyanuric chloride with 1 mol of ammonia or with 1 mol of one of the above specified amines. The resulting dihalogen triazine compounds of the Formula 2, for the manufacture of the monoazo dyestuffs according to the invention, can be condensed with already produced amino monoazo dyestuffs of the specified type, which contain an acylatable amino group, or advantageously with the coupling components applicable for the preparation of such dyestuffs and containing together with the group capable of dyestuff production also an acylatable amino group.

As examples of resulting coupling components, which contain a 4-amino-2-halogen triazine radical of the specified type there may be mentioned:

The secondary condensation products from 1 mol of cyanuric chloride, 1 mol of ammonia or 1 mol of an aminobenzene sulfonic acid and 1 mol of 2-amino-8-hydroxynaphthalene-6-sulfonic acid, 2-amino-5-hydroxynaphthalene-7-sulfonic acid, 2-amino-6-hydroxynaphthalene-8-sulfonic acid or 2-(4'-aminobenzoylamino)-5-hydroxynaphthalene-7-sulfonic acid.

In the production of the dyestuffs of the invention by condensation of one of the mentioned amino monoazo dyestuffs with cyanuric chloride and one of the likewise specified simpler amines, in most cases the sequence of the condensations can be selected as desired. The necessary condensations for the production of the secondary condensation products to be used as coupling components can likewise be carried out in any desired sequence. If the resulting secondary condensation product to be used as coupling components contain two or more than two water-solubilizing groups, they can be combined not only with the amino sulfonic acids and aminobenzene carboxylic acids specified as diazo components but also with amines free from acid, water-solubilizing groups, for example with chloro- and/or nitro-anilines or alkoxy, alkyl or acylamino-aminobenzenes.

In spite of the presence of labile halogen atoms in the dyestuffs of this invention they can, without loss of their valuable properties, be isolated and worked up to dry dye preparations. The isolation in the process of the invention preferably takes place at as low a temperature as possible by salting out and filtration. The filtered dyestuffs can be dried, if desired after the addition of color stretching agents and/or of buffer substances, for example after the addition of a mixture of equal parts of mono- and di-sodium phosphate. The drying is preferably carried out at not too high temperatures and under reduced pressure. In some cases dry preparations can be obtained directly by spray drying of the whole reaction mixture, i. e. without intermediate isolation of the dyestuffs.

The new dyestuffs of the invention are suitable for the dyeing and printing of a wide variety of materials, especially cellulosic materials of fibrous structure, such as linen, regenerated cellulose and primarily cotton. They are especially suitable for dyeing by the so-called pad-dyeing process, according to which the goods are impregnated with aqueous dyestuff solutions, if desired also containing salt, and the dyestuffs fixed, preferably in the hot, after an alkali treatment. This process and the direct dye method which is also applicable in the case of many of the dyestuffs obtained by the present process, give dyeings which are distinguished as a rule by the purity of their color shades, by a good fastness to light and primarily by outstanding fastness to washing.

By the printing process valuable and fast printings are likewise obtained when the dyestuffs are fixed on the printed goods by heat treatment in the presence of alkali.

When the dyestuffs contain metal-complex forming groups, for example o:o'-dihydroxy azo groupings or o-hydroxycarboxy groupings, as for example in the case of salicylic acid radicals, the dyeings obtained therewith can be treated with agents providing metal, for example agents providing chromium but preferably agents providing nickel and copper. The treatment with the agents providing metal can be carried out by methods of known type. If desired very valuable dyeings can be obtained by operating in accordance with the process in which the dyeings produced with the metal-free dyestuffs are after-treated with aqueous solutions containing water-soluble compounds, especially complex copper compounds, and basic formaldehyde condensation products from compounds containing at least once in the molecule the atom grouping.

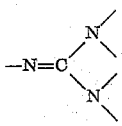

or compounds, for example cyanamide, that can easily be converted into such compounds.

The following examples illustrate the invention, the parts and percentages being by weight unless otherwise stated and the relation between part by weight and part by volume being the same as that between the kilogram and the liter.

*Example 1*

46.7 parts of the disodium salt of the monoazo dyestuff obtainable from 1 mol of diazotized 1-aminobenzene-3-sulfonic acid and 1 mol of 2-amino-5-hydroxynaphthalene-7-sulfonic acid in an alkaline medium are dissolved in 2,000 parts of water and added to an ice-cold suspension of 18.4 parts of cyanuric chloride in 200 parts of water, whereupon in the course of 1–2 hours about 50 parts by volume of 2 N-sodium carbonate solution are added dropwise. The reaction should throughout remain weakly acid (pH 5–6) and the temperature be maintained between 0 and 5° C. When the free amino group can no longer be detected, 35 parts of 10% ammonia solution are added and stirring carried out for 4 hours at 30–40° C. The dyestuff is then salted out with sodium chloride, filtered and dried. It dissolves in water with a yellow orange color and dyes cotton by the pad dyeing process or from alkaline solution containing much salt, in pure orange shades.

The same dyestuff is obtained when in this example the condensation is carried out in the converse sequence, i. e. when ammonia is first condensed with the cyanuric chloride and the resulting primary condensation product reacted with the monoazo dyestuff.

*Example 2*

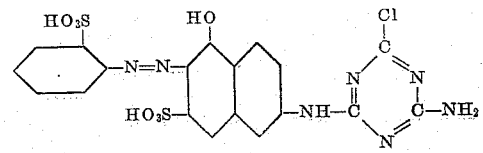

23.9 parts of 2-amino-5-hydroxynaphthalene-7-sulfonic acid are dissolved in water with the addition of 5.6 parts of sodium carbonate. The solution is allowed to flow slowly into an ice-cold suspension of 18.4 parts of cyanuric chloride in 200 parts of water. Then in the course of 1 hour 50 parts of 2 N-sodium carbonate solution are added dropwise in such a manner that the reaction of the mixture remains weakly acid to Congo red. The resulting primary condensation product is subjected to the addition of the diazo compound obtained from 17.3 parts of 1-amino-benzene-2-sulfonic acid. Then gradually 25 parts of sodium bicarbonate are added and stirring carried on with ice cooling until diazo compound can no longer be detected. Then the dyestuff formed is precipitated with sodium chloride and filtered. The resulting paste is dissolved in 2,000 parts of water and treated with 35 parts of 10% ammonia solution. The whole is maintained for 4–6 hours at 40° C. with stirring, precipitation effected by addition of sodium chloride and the dyestuff formed filtered and dried under vacuum. It dyes cotton in orange shades.

*Example 3*

23 parts of 5-acetylamino-2-aminobenzene-1-sulfonic acid are diazotized in the customary manner in the presence of hydrochloric acid with 6.9 parts of sodium nitrite. The diazo compound is then introduced into an ice-cold solution of 38.7 parts of the primary condensation product obtainable by the method of Example 2 from 1 mol of 2-amino-5-hydroxynaphthalene-7-sulfonic acid and 1 mol of cyanuric chloride, and 25 parts of sodium bicarbonate. When the coupling is complete, the dyestuff is salted out, filtered off, dissolved in 2,000 parts of water and treated with a neutral solution of 17.3 parts of 1-aminobenzene-3-sulfonic acid. 10 parts of crystalline sodium bicarbonate are added and the mixture stirred for 4–6 hours at 30–40° C. The dyestuff is then salted out, filtered off and dried under vacuum at 60° C. It dissolves with a yellow red color in water and dyes cotton from an alkaline bath containing much salt in very pure scarlet red shades fast to light and washing.

*Example 4*

The diazo compound prepared in the customary manner from 23 parts of 5-acetylamino-2-aminobenzene-1-sulfonic acid is coupled in the presence of sodium bicarbonate with 52.3 parts of the secondary condensation product from 1 mol of cyanuric chloride, 1 mol of 2-amino-5-hydroxynaphthalene-7-sulfonic acid and 1 mol of 1-aminobenzene-3-sulfonic acid. The resulting dyestuff shows practically the same properties as the dyestuff obtained according to Example 3.

*Example 5*

17.3 parts of 1-aminobenzene-2-sulfonic acid are dissolved in 300 parts of water with the addition of 5.3 parts of sodium carbonate. The resulting, neutral solution is allowed to flow into an ice-cold aqueous suspension of 18.4 parts of cyanuric chloride and the mineral acid formed is gradually neutralized by the addition of dilute sodium hydroxide solution. As soon as the condensation is complete, i. e. when the free amino group can no longer be detected, a neutral solution of 23.9 parts of 2-amino-5-hydroxynaphthalene-7-sulfonic acid is allowed to flow in and the mixture is stirred at 20° C. About 90 parts of N-caustic soda solution are gradually added dropwise in such a manner that a pH value of 6 is not exceeded. The condensation is completed in about 2 hours.

The resulting solution, after cooling, is treated with 20 parts of sodium bicarbonate and with the diazo compound prepared from 23 parts of 5-acetylamino-2-aminobenzene-1-sulfonic acid according to Example 3. The dyestuff partially precipitates. After a few hours it is salted out, filtered off and dried. It dyes cotton from an alkaline bath containing much salt in very pure scarlet red shades fast to light and washing.

The following table sets out similar dyestuffs which are obtained when instead of the 1-aminobenzene-2-sulfonic acid the compounds mentioned in column III and instead of 2-amino-5-hydroxynaphthalene-7-sulfonic acid the compounds set forth in column II and instead of the diazo compound obtained from 5-acetylamino-2-aminobenzene-1-sulfonic acid the diazo compounds obtainable from the amines set forth in column I are used. These dyestuffs dye cotton in the shades shown in column IV,

| | I | II | III | IV |
|---|---|---|---|---|
| 1 | 1-Aminobenzene-3-sulfonic acid. | 2-Amino-5-hydroxynaphthalene-7-sulfonic acid. | 1-Aminobenzene-3-sulfonic acid. | orange. |
| 2 | ---do--- | ---do--- | 1-Aminobenzene-2-sulfonic acid. | Do. |
| 3 | ---do--- | ---do--- | Methylamine | Do. |
| 4 | ---do--- | ---do--- | Diethylamine | Do. |
| 5 | ---do--- | ---do--- | Morpholine | Do. |
| 6 | 1-Aminobenzene-2-sulfonic acid. | ---do--- | 1-Aminobenzene-3-sulfonic acid. | Do. |
| 7 | ---do--- | ---do--- | γ-Methoxypropylamine | Do. |
| 8 | ---do--- | 2-N-ethylamino-5-hydroxynaphthalene-7-sulfonic acid. | NH₃ | Do. |
| 9 | 2-(4'-Aminophenyl)-6-methylbenzthiazole-disulfonic acid. | 2-Amino-5-hydroxynaphthalene-7-sulfonic acid. | 1-Aminobenzene-3-sulfonic acid. | scarlet red. |
| 10 | 1-Aminobenzene-3-sulfonic acid. | 2-Amino-8-hydroxynaphthalene-6-sulfonic acid. | NH₃ | yellowish red. |
| 11 | ---do--- | ---do--- | 1-Aminobenzene-3-sulfonic acid. | Do. |
| 12 | 1-Aminobenzene-2-sulfonic acid. | ---do--- | NH₃ | Do. |
| 13 | 2-Aminonaphthalene-4:8-disulfonic acid. | 2-Amino-5-hydroxynaphthalene-7-sulfonic acid. | 1-Aminobenzene-2-sulfonic acid. | scarlet. |
| 14 | 2-Aminonaphthalene-5:7-disulfonic acid. | ---do--- | NH₃ | Do. |
| 15 | 2-Aminonaphthalene-6:8-disulfonic acid. | ---do--- | NH₃ | Do. |
| 16 | 2-Aminonaphthalene-4:8-disulfonic acid. | 2-Amino-8-hydroxynaphthalene-6-sulfonic acid. | 1-Aminobenzene-3-sulfonic acid. | red. |
| 17 | 1-Aminobenzene-3-sulfonic acid. | 2-Amino-6-hydroxynaphthalene-8-sulfonic acid. | ---do--- | scarlet. |
| 18 | 1-Aminobenzene-2-carboxylic acid. | 2-Amino-5-hydroxynaphthalene-7-sulfonic acid. | ---do--- | orange. |
| 19 | 1-Aminobenzene-3-carboxylic acid. | ---do--- | ---do--- | Do. |
| 20 | ---do--- | ---do--- | 4-Amino-1,1'-diphenyl-4'-sulfonic acid. | Do. |
| 21 | 5-Acetylamino-2-aminobenzene-1-sulfonic acid. | 2-Amino-5-hydroxynaphthalene-7-sulfonic acid. | Anthranilic acid | scarlet. |
| 22 | ---do--- | ---do--- | NH₃ | Do. |
| 23 | ---do--- | ---do--- | Taurine | Do. |
| 24 | ---do--- | ---do--- | γ-Methoxypropylamine | Do. |
| 25 | ---do--- | ---do--- | 2-Aminoethanol | Do. |
| 26 | ---do--- | ---do--- | 2-Amino-1-propanol | Do. |
| 27 | ---do--- | ---do--- | Morpholine | Do. |
| 28 | ---do--- | ---do--- | Amino-acetic acid | Do. |
| 29 | ---do--- | ---do--- | 3-Aminobenzoic acid | Do. |
| 30 | ---do--- | ---do--- | 2-Aminonaphthalene-4:8-disulfonic acid. | Do. |
| 31 | ---do--- | ---do--- | 1-Aminobenzene-2,5-disulfonic acid. | Do. |
| 32 | ---do--- | 2-Amino-5-hydroxynaphthalene-1:7-disulfonic acid. | 1-Aminobenzene-3-sulfonic acid. | Do. |
| 33 | 5-Hydroxyacetylamino-2-aminobenzene-1-sulfonic acid. | 2-Amino-5-hydroxynaphthalene-7-sulfonic acid. | 1-Aminobenzene-2-sulfonic acid. | scarlet red. |
| 34 | 4-Acetylamino-1-aminobenzene-3-sulfonic acid. | ---do--- | NH₃ | scarlet. |
| 35 | 4-Acetylamino-2-aminobenzene-1-sulfonic acid. | ---do--- | NH₃ | orange. |
| 36 | ---do--- | ---do--- | 1-Aminobenzene-3-sulfonic acid. | Do. |
| 37 | 1-Aminobenzene-2-sulfonic acid. | 2-(4'-Aminophenyl)-amino-5-hydroxynaphthalene-7:3'-disulfonic acid. | 1-Aminobenzene-2-sulfonic acid. | red-orange. |
| 38 | ---do--- | 2-(4'-Aminobenzoyl)-amino-5-hydroxynaphthalene-7-sulfonic acid. | ---do--- | orange. |
| 39 | ---do--- | ---do--- | 1-Aminonaphthalene-6-sulfonic acid. | Do. |
| 40 | 2-Aminonaphthalene-4:8-disulfonic acid. | 2-Amino-5-hydroxynaphthalene-7-sulfonic acid. | Aniline | scarlet. |

These dyestuffs can likewise be prepared by the methods set forth in Examples 1-4.

*Example 6*

2 parts of the dyebath obtainable according to Example 1, which in the form of the free acid corresponds to the formula

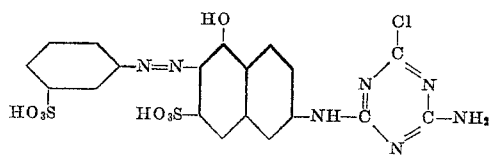

are dissolved in 100 parts of water by boiling.

The solution is added to 3900 parts of cold water, 40 parts of trisodium phosphate and 80 parts of sodium chloride are added and 100 parts of a cotton fabric are entered into this dyebath.

The temperature is raised within 45 minutes to 90° C., another 80 parts of sodium chloride being added after 30 minutes. The temperature is maintained for 30 minutes at 90° C. and the dyeings are then soaped for 15 minutes in an 0.3% boiling solution of a non-ionic washing agent, rinsed and dried.

A pure orange dyeing results which is fast to light and washing.

*Example 7*

1 part of the dyestuff obtained according to Example 3 is dissolved in 100 parts of water. A staple fiber fabric is impregnated with the resulting solution so that its weight increases by 75% and it is then dried.

The fabric is then impregnated with a solution at 20° C. containing per liter 10 grams of sodium hydroxide and 300 grams of sodium chloride and squeezed off to an increase in weight of 75%. The dyeing is steamed for 60 seconds at 100-101° C., rinsed, soaped for a quarter of an hour in an 0.3% boiling solution of a non-ionic washing agent, rinsed and dried. A scarlet red dyeing fast to washing is obtained.

When instead of the staple fiber fabric a cotton fabric is used, a similar good result is obtained.

What is claimed is:

1. A monoazo-dyestuff corresponding to the formula

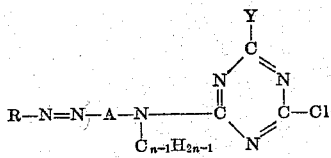

wherein R represents an at least monocylic and at most bicyclic aromatic radical, $n$ represents a whole number of at most 3, A represents the radical of a naphthalene sulfonic acid bound to the azo linkage in vicinal position of a hydroxyl group and to the

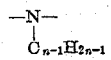

group in $\beta$-position of the naphthalene nucleus and Y represents an amino group containing up to 12 carbon atoms, at least one of the radicals R and Y containing a member selected from the group consisting of carboxylic and sulfonic acid groups.

2. A monoazo dyestuff which in its free acid state corresponds to the formula

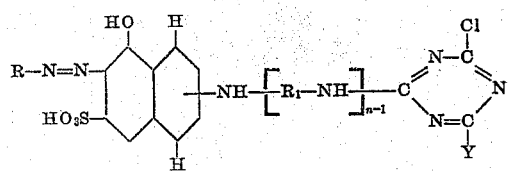

wherein R represents an at least monocyclic and at most bicyclic aromatic carboxylic radical, $n$ represents a whole positive number of at most 2, $R_1$ represents a benzene radical and Y an amino group which contains a water-solubilizing group, when it is aromatic, and at most 12 carbon atoms, at least one of the radicals R, $R_1$ and Y containing a sulfonic acid group.

3. A monoazo dyestuff which in its free acid state corresponds to the formula

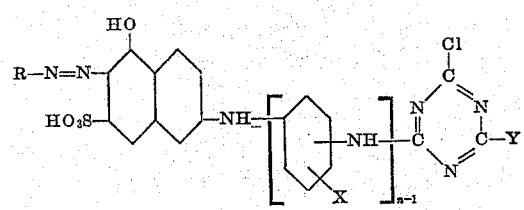

wherein $n$ represents a whole positive number of at most 2, R represents a member selected from the group consisting of the radical of a monocyclic benzene sulfonic acid, that of a monocyclic benzene carboxylic acid and that of a naphthalene disulfonic acid, X represents a member selected from the group consisting of a hydrogen atom and a sulfonic acid group, and Y represents a member selected from the group consisting of an $NH_2$-group and the radical of a lower primary amine having at most 6 carbon atoms.

4. A monoazo dyestuff according to claim 3 wherein $n$ is 1 and Y aliphatic.

5. A monoazo dyestuff according to claim 3 wherein $n$ is 1 and Y corresponds to the formula

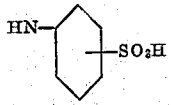

6. A monoazo dyestuff according to claim 3, wherein $n$ is 1 and Y corresponds to the formula

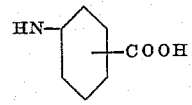

7. A monoazo dyestuff according to claim 3, wherein $n$ is 1 and R contains a sulfonic acid group in ortho position to the azo linkage.

8. The monoazo dyestuff which in its free acid state corresponds to the formula

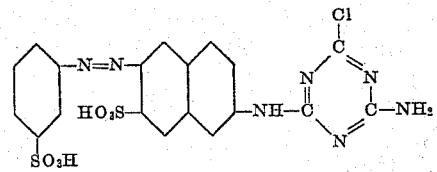

9. The monoazo dyestuff which in its free acid state corresponds to the formula

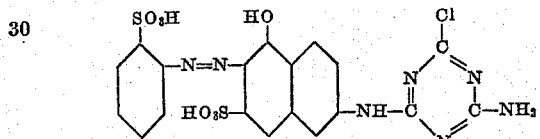

10. The monoazo dyestuff which in its free acid state corresponds to the formula

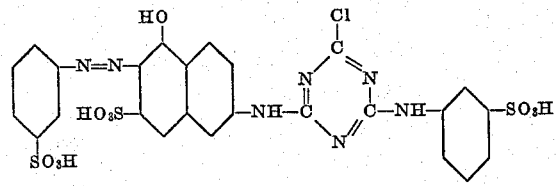

11. The monoazo dyestuff which in its free acid state corresponds to the formula

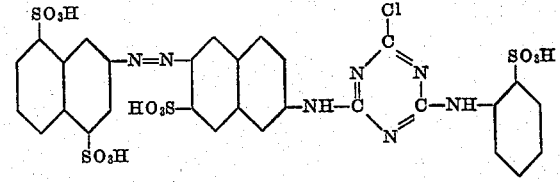

12. The monoazo dyestuff which in its free acid state corresponds to the formula

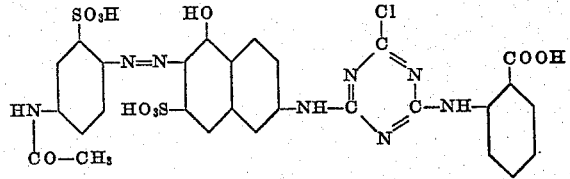

References Cited in the file of this patent
UNITED STATES PATENTS
1,867,451    Gyr ------------------ July 12, 1932

UNITED STATES PATENT OFFICE
Certificate of Correction

Patent No. 2,873,269  February 10, 1959

Alfred Fasciati et al.

It is hereby certified that error appears in the printed specification of the above numbered patent requiring correction and that the said Letters Patent should read as corrected below.

Column 2, line 39, for "(4'-aminobenzolamino)" read —(4'-aminobenzoylamino)—; column 5, lines 74 and 75, for "precipiated" read —precipitated—; column 6, line 11, for "aciid" read —acid—; column 10, lines 21 to 25, inclusive, the center portion of the formula should appear as shown below instead of as in the patent:

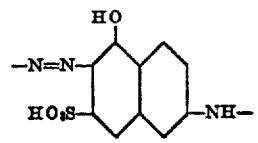

same column 10, lines 50 to 54, inclusive, the center portion of the formula should read as shown below instead of as in the patent:

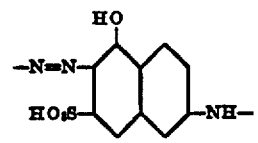

Signed and sealed this 24th day of May 1960.

[SEAL]

Attest:
KARL H. AXLINE,
*Attesting Officer.*

ROBERT C. WATSON,
*Commissioner of Patents.*